US006954204B2

(12) United States Patent
Zatz et al.

(10) Patent No.: US 6,954,204 B2
(45) Date of Patent: Oct. 11, 2005

(54) PROGRAMMABLE GRAPHICS SYSTEM AND METHOD USING FLEXIBLE, HIGH-PRECISION DATA FORMATS

(75) Inventors: Harold Robert Feldman Zatz, Palo Alto, CA (US); Walter E. Donovan, Saratoga, CA (US); John Erik Lindholm, Saratoga, CA (US); Steven E. Molnar, Chapel Hill, NC (US); John S. Montrym, Cupertino, CA (US)

(73) Assignee: NVIDIA Corporation, Santa Clara, CA (US)

( * ) Notice: Subject to any disclaimer, the term of this patent is extended or adjusted under 35 U.S.C. 154(b) by 287 days.

(21) Appl. No.: 10/302,465

(22) Filed: Nov. 22, 2002

(65) Prior Publication Data

US 2004/0189651 A1 Sep. 30, 2004

Related U.S. Application Data

(60) Provisional application No. 60/397,247, filed on Jul. 18, 2002.

(51) Int. Cl.[7] .................................................. G06T 1/00
(52) U.S. Cl. ............................ 345/522; 345/506; 712/28
(58) Field of Search ................................. 345/502, 505, 345/506, 522, 531; 712/23, 28

(56) References Cited

U.S. PATENT DOCUMENTS

| 6,115,047 A | * | 9/2000 | Deering ....................... 345/422 |
| 6,236,413 B1 | * | 5/2001 | Gossett et al. .............. 345/506 |
| 6,825,843 B2 | * | 11/2004 | Allen et al. .................. 345/522 |

OTHER PUBLICATIONS

Peercy, Mark S., Marc Alano, John Airey, and P. Jeffery Ungar, "Interactive Multi–Pass Programmable Shading", Proceedings of SIGGRAPH 2000 (New Orleans, Louisiana, Jul. 23–28, 2000). In Computer Graphics, Annual Conference Series,ACM SIGGRAPH, 2000.

Olano, Marc and Anselmo Lastra, "A Shading Language on Graphics Hardware: The PixelFlow Shading System", Proceedings of SIGGRAPH 98 (Orlando, FLorida, Jul. 19–24, 1998). In Computer Graphics, Annual Conference Series, ACM SIGGRAPH, 1998.

* cited by examiner

Primary Examiner—Matthew C. Bella
Assistant Examiner—Mackly Monestime
(74) Attorney, Agent, or Firm—Moser Patterson & Sheridan LLP

(57) ABSTRACT

A programmable graphics system and method for processing high precision graphics data represented in one or more data formats in one or more passes. Graphics program instructions executed by the system control the processing and format conversion of the data. The program instructions and the data are stored in a memory accessible by the system. Within the memory, contiguous memory entries can contain program instructions or data represented in different formats. The format used to represent a particular data element within the data, is specified in the state information maintained in the system and is used to configure format conversion units within the system. High precision data, such as floating color, is processed by the programmable graphics system and output via a digital to analog converter (DAC) for display.

51 Claims, 13 Drawing Sheets

PROGRAMMABLE GRAPHICS SYSTEM AND METHOD USING FLEXIBLE, HIGH-PRECISION DATA FORMATS

CROSS-REFERENCE TO RELATED APPLICATIONS

This application claims priority from commonly owned Provisional U.S. patent application Ser. No. 60/397,247 entitled "Method and Apparatus for Using Multiple Data Formats in a Unified Graphics Memory," filed Jul. 18, 2002, which is incorporated herein by reference.

BACKGROUND

1. Field of the Invention

The invention is in the field of computer graphics, and more particularly to processing multiple data formats in a multi-pass graphics pipeline.

2. Description of the Related Art

Current multi-pass data processing methods are exemplified by systems and methods developed for computer graphics. This specialized field includes technology wherein data is processed through pipeline in multiple passes, wherein each pass typically performs a specific sequence of operations on the data and uses the output of one pass during processing of a subsequent pass. At the end of a first pass the output data is written to memory (local or host). During a subsequent pass the output data from the first pass is read from memory and processed.

Prior to writing the output data, the output data is converted to a predetermined format that can be read and processed by another unit in the pipeline and will pack efficiently into memory. Typically the conversion reduces the number of bits used to represent the data, so that the precision and dynamic range of subsequent calculations is likewise reduced. An advantage of reducing the number of bits used to represent the data is that less memory is required to store the data and the unit reading the data does not need to perform format conversion. A disadvantage is that subsequent calculations are performed at lower precision, consequently limiting the extent and types of algorithms that can be programmed for execution in the graphics pipeline. For example, referring now to FIG. 1, pixel data generated by a Raster Operation Unit 165 and stored in a Local Memory 135 may be read from Local Memory 135 back into Raster Operation Unit 165 or a Texturer 155. However, data written to Local Memory 135 by Raster Operation Unit 165 is not read by a Geometry Processor 140 without first being modified by Host Computer 110. This is because the format of the data output by Raster Operation Unit 165 is not a format that can be processed directly by Geometry Processor 140.

When the last pass through the Graphics Pipeline 170 has been completed, the pixel data written to Local Memory 135 by Raster Operation Unit 165 is in a fixed point format, typically four 8 bit components per pixel, red, green, blue, and alpha (RGBA). The pixel data is output to a Display 175, e.g., liquid crystal display (LCD) or cathode ray tube (CRT), via a Scanout 180. Within Scanout 180, a digital to analog converter (DAC) drives the signals required for displaying the final image on Display 175. It is desirable to display the image in a high precision format, such as floating point, to achieve a high quality image. This would require Raster Operation Unit 165 to store the pixel data in floating point format in Local Memory 135 instead of a fixed point format.

Graphics pipelines, such as Graphics Pipeline 170, typically support a limited number of data formats to reduce the complexity of conversion between formats and management of state information indicating the format of the data in the pipeline and stored in memory. A consistent format is used for data relating to a particular image, texture map, or geometry. For example, the information identifying the format for an image is stored in a table or, alternatively, stored in memory with the image data. The disadvantage of storing the format in a table is the size of the table can be limited, thereby limiting the number of images that can be stored simultaneously.

For the foregoing reasons, there is a need for a graphics system that supports high precision data formats during multi-pass rendering and floating point format output to a DAC.

SUMMARY

The present invention satisfies the need for a programmable graphics fragment processing pipeline that supports high precision data formats during multi-pass rendering, and includes a mechanism for identifying the data format for each surface, and surfaces composed of data elements represented in varying formats. The ability of the present invention to maintain precision and dynamic range of intermediate results that are generated and reprocessed by the programmable graphics fragment processing pipeline during multi-pass rendering enables generation of high quality images and processing of data in addition to color and depth. The ability of the present invention to support surfaces of varying formats provides a user with greater flexibility in storing and processing data. The present invention also satisfies the need for an output controller that reads and converts data represented in floating point format that is processed by a DAC. Providing floating point format data to the DAC permits display of high quality images.

Various embodiments of the invention include a graphics subsystem comprising a programmable graphics fragment processing pipeline including a read interface, an input format converter, a computation unit, an output format converter, a write interface, and an output controller to read and convert data to be processed by a DAC. The read interface reads data represented in one of several formats from a memory. The input format converter uses program instructions to configure the input format conversion logic to format convert the read data prior to processing by the programmable computation unit in the programmable graphics fragment processing pipeline. The programmable computation unit performs calculations on the converted data and outputs generated data. The output format converter uses program instructions to configure the output format conversion logic to format convert the generated data output by the programmable computation unit. The write interface writes the format converted generated data to the memory. The read interface in the output controller reads memory data represented in a floating point format from the memory. The converter in the output controller converts the read data represented in a floating point format to a format that is processed by a DAC.

Additionally, the invention can include a host processor, a host memory, and a system interface configured to interface with the host processor. Furthermore, the programmable graphics fragment processing pipeline can include a packer and unpacker that facilitate storing data efficiently. The unpacker accepts the read data and program instructions from the read interface and separates the data elements within a memory entry under the control of program instructions. The unpacked data elements are output to the input format converter. The packer receives the output format converted data elements and aligns the output format converted data elements within a memory entry under the control of program instructions, packing the data elements before the data elements are written to the memory. Each data element packed within a memory entry can be represented in one of several formats.

The present invention includes a method of using a memory storing surfaces comprising the steps of reading a data element from the memory, format converting the data element, processing the converted data element under control of program instructions generating one or more data elements, format converting the processed data elements, and writing the format converted processed data elements to the memory. The steps are repeated until all of the program instructions are executed. The format convering converts data represented in one of the several formats and converts it to data represented in an other of the several formats. The processed graphics data is represented in a floating point format and is read from the memory and converted for display via a DAC.

Additionally, the method can use a computing system including the memory storing surfaces containing data elements each represented in one of several formats. Furthermore, the method can include packing and unpacking. Unpacking separates the data elements read from a memory entry in the memory under the control of program instructions prior to format converting each data element. Packing aligns the format converted processed data elements within a memory entry under the control of program instructions, prior to writing the format converted processed data elements to the memory.

Still further, a first surface comprised of data elements where each data element is represented in one of two formats can be separated into a second and third surface where the second surface is comprised of data elements represented in one of the two formats and the third surface is comprised of data elements represented in the other of the two formats.

The method of processing graphics data also includes storing data elements comprising a surface in noncontiguous memory entries in the memory.

BRIEF DESCRIPTION OF THE VARIOUS VIEWS OF THE DRAWINGS

DISCLOSURE OF THE INVENTION

The current invention involves new systems and methods for processing graphics data stored in different formats. The present invention is directed to a system and method that satisfies the need for a programmable graphics pipeline that supports high precision data formats during multi-pass rendering, supports floating point format output to a DAC, and includes a mechanism for identifying both the format for each surface and the format for each memory entry and data element within a surface.

Figure 1:
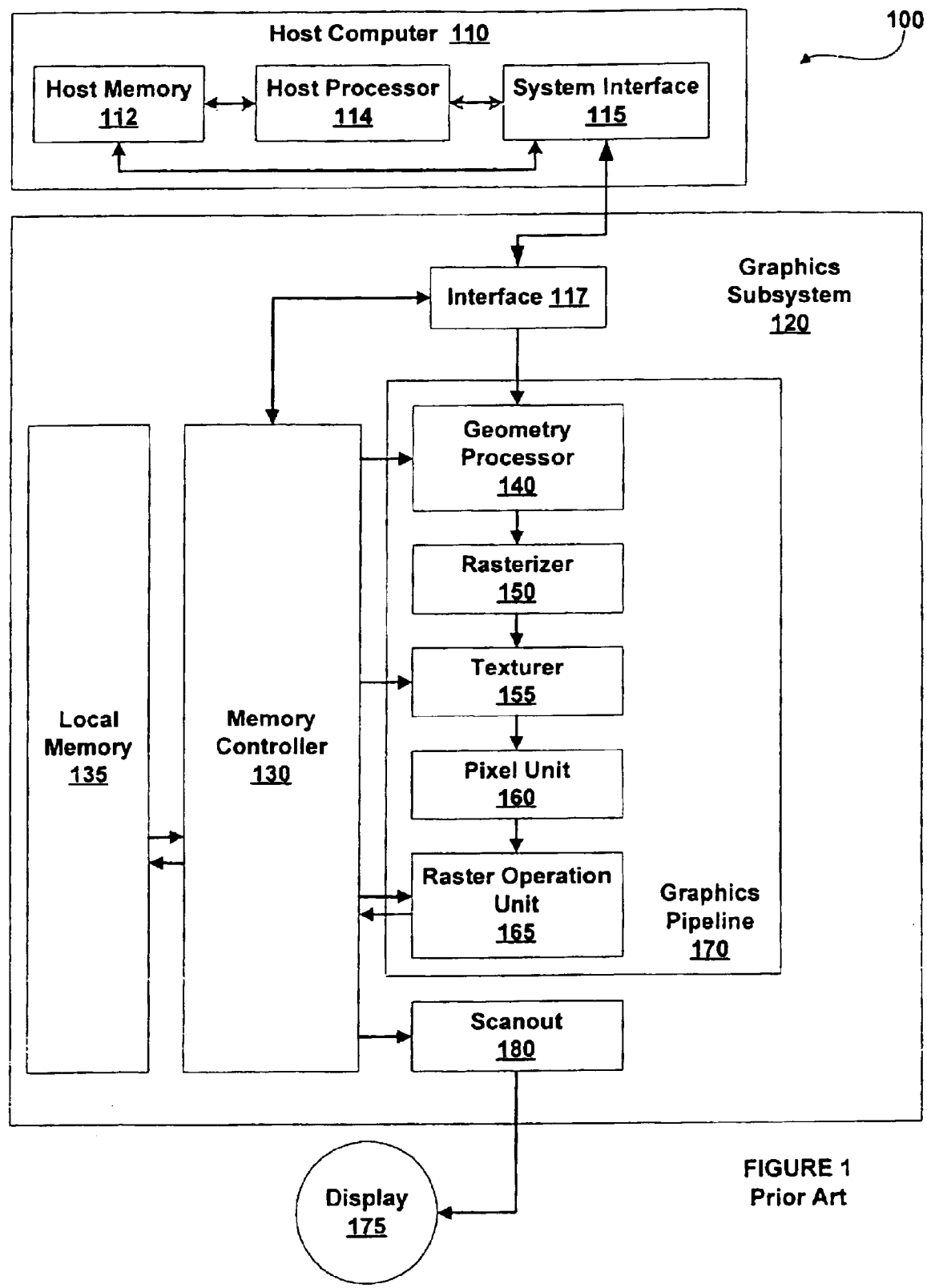
FIG. 1 is a block diagram illustrating a prior art general computing system including a graphics subsystem.
Figure 2:
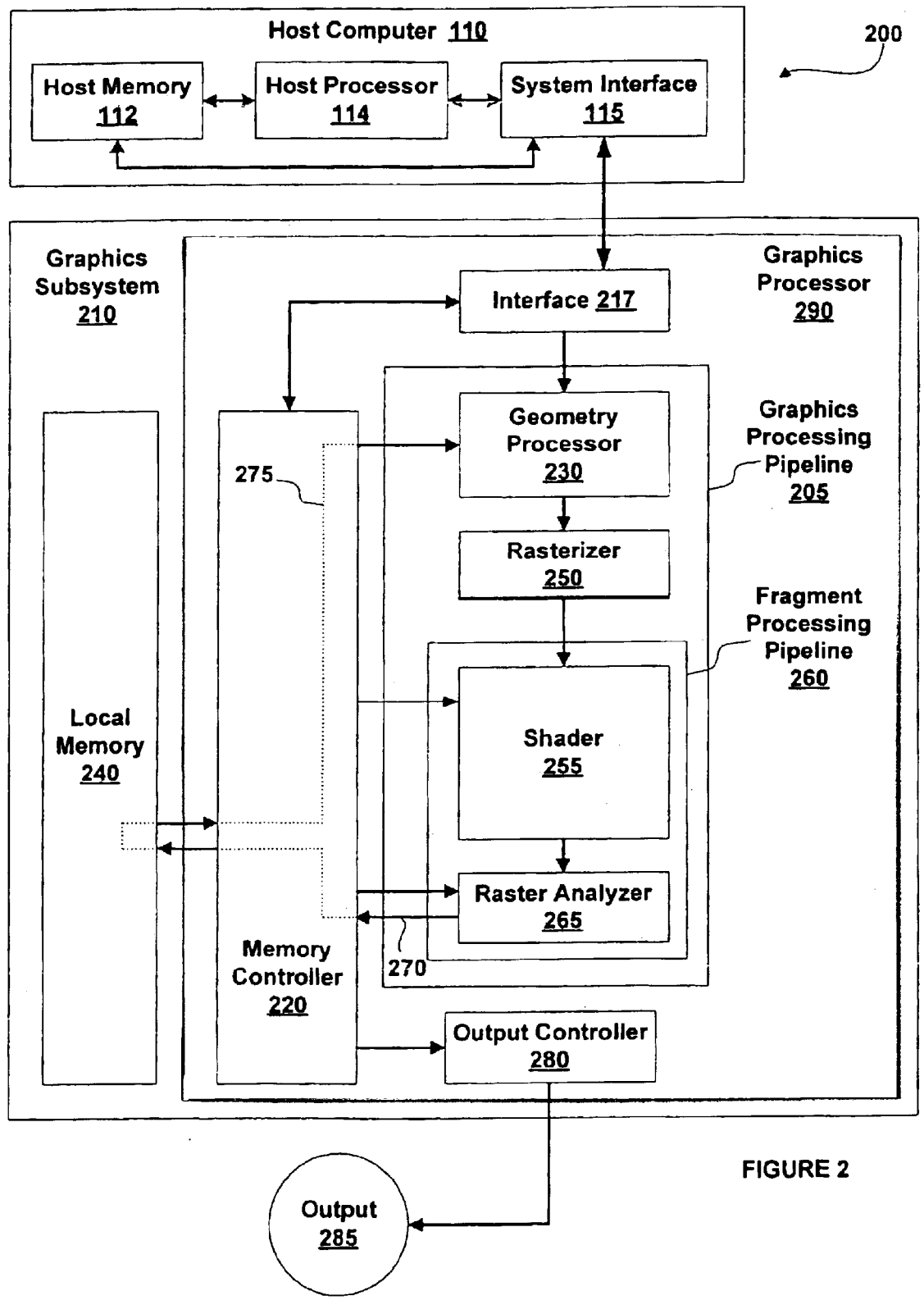
FIG. 2 illustrates one embodiment of a computing system according to the invention including a host computer and a graphics subsystem.

FIG. 2 is an illustration of a Computing System generally designated 200 and including a Host Computer 110 and a Graphics Subsystem 210. Computing System 200 may be a desktop computer, server, laptop computer, handheld computer, tablet, game console, cellular telephone, computer based simulator, or the like. Host Computer 110 includes Host Processor 114 which may include a system memory controller to interface directly to Host Memory 112 or may communicate with Host Memory 112 through a System Interface 115. System Interface 115 may be an I/O (input/output) interface or a bridge device including the system memory controller to interface directly to Host Memory 112. Examples of System Interface 115 known in the art include Intel® Northbridge and Intel® Southbridge.

Host computer 110 communicates with Graphics Subsystem 210 via System Interface 115 and an Interface 217. Data received at Interface 217 can be passed to a Geometry Processor 230 or written to a Local Memory 240 through Memory Controller 220. Memory Controller 220 is configured to handle data sizes from typically 8 to more than 128 bits and generates the read and write addresses and control signals to Local Memory 240. For example, in one embodiment, Memory Controller 220 is configured to receive data through Interface 217 from a 64-bit wide bus between Interface 217 and System Interface 115. 32-bit data is internally interleaved to form 128 or 256-bit data types. In addition to communicating with Local Memory 240 and Interface 217, Memory Controller 220 also communicates with a Graphics Processing Pipeline 205 and an Output Controller 280 through read and write interfaces in Graphics Processing Pipeline 205 and a read interface in Output Controller 280. The read and write interfaces generate address and control signals to Memory Controller 220.

Graphics Processing Pipeline 205 further includes, among other components, Geometry Processor 230 and a programmable graphics fragment processing pipeline, Fragment Processing Pipeline 260, that each contain one or more programmable graphics processing units to perform a variety of computational functions. Some of these functions are table lookup, scalar and vector addition, multiplication, division, coordinate-system mapping, calculation of vector normals, tessellation, calculation of derivatives, interpolation, and the like. Geometry Processor 230 and Fragment Processing Pipeline 260 are optionally configured such that data processing operations are performed in multiple passes through Graphics Processing Pipeline 205 or in multiple passes through Fragment Processing Pipeline 260.

Geometry Processor 230 receives a stream of program instructions and data and performs vector floating-point operations or other processing operations. It should be understood that the program instructions and data can be read from or written to memory, e.g., any combination of Local Memory 240 and Host Memory 112. When Host Memory 112 is used to store program instructions and data the portion of memory can be uncached so as to increase performance of access by a Graphics Processor 290. Processed data is passed from Geometry Processor 230 to a Rasterizer 250. In a typical implementation Rasterizer 250 performs scan conversion and outputs fragment, pixel, or sample data and program instructions to Fragment Processing Pipeline 260. Alternatively, Rasterizer 250 resamples input vertex data and outputs additional vertices. Therefore Fragment Processing Pipeline 260 is programmed to operate on vertex, fragment, pixel, sample or any other data. For simplicity, the remainder of this description will use the term fragments to refer to pixels, samples and/or fragments.

Fragment Processing Pipeline 260 is programmed to process fragments using shader programs that are sequences of program instructions compiled for execution within Fragment Processing Pipeline 260. Furthermore, a Shader 255, within Fragment Processing Pipeline 260, is optionally configured using shader programs such that data processing operations are performed in multiple passes within Shader 255. Data processed by Shader 255 is passed to a Raster Analyzer 265, which performs operations similar to prior art Raster Operation Unit 165 and saves the results in Local Memory 240. Raster Analyzer 265 includes a read interface and a write interface to Memory Controller 220 through which Raster Analyzer 265 accesses data stored in Local Memory 240. Traditionally, the precision of the pixel data written to memory is limited to the color display resolution (24 or 32 bits) and depth (16, 24, or 32 bits). Because Graphics Processing Pipeline 205 is designed to process and output high resolution data, the precision of data generated by Graphics Processing Pipeline 205 need not be limited prior to storage in Local Memory 240. For example, in various embodiments the output of Raster Analyzer 265 is 32, 64, 128-bit or higher precision, fixed or floating-point data. These data are written from Raster Analyzer 265 through Memory Controller 220 to Local Memory 240 through multiple write operations using an Internal Bus 270.

In various embodiments Memory Controller 220, Local Memory 240, and Geometry Processor 230 are configured such that data generated at various points along Graphics Processing Pipeline 205 can be output via Raster Analyzer 265 and provided to Geometry Processor 230 or Shader 255 as input. For example, in some embodiments output of Raster Analyzer 265 is transferred along a data path 275, which optionally includes storage in Local Memory 240. Since the output of Raster Analyzer 265 can include floating-point data types, data is optionally passed along data path 275 without loss of precision. Furthermore, data is optionally processed in multiple passes through Graphics Processing Pipeline 205 without a loss of precision.

When processing is completed, an Output 285 of Graphics Subsystem 210 is provided using Output Controller 280. Output Controller 280 is optionally configured to deliver data to a display device, network, electronic control system, other Computing System 200, other Graphics Subsystem 210, or the like.

Figure 3:
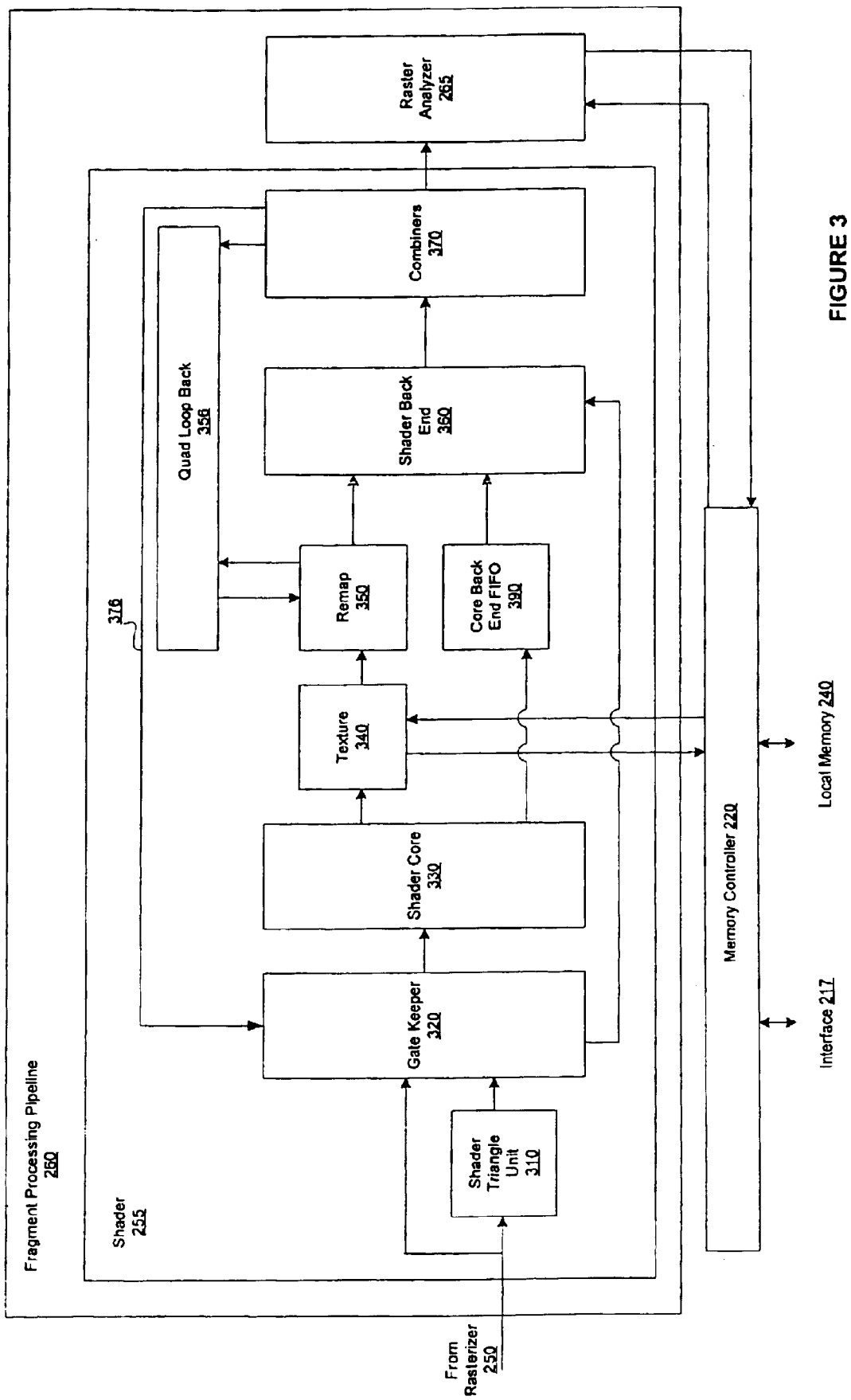
FIG. 3 is a block diagram of an embodiment of the Shader of FIG. 2.

FIG. 3 is a block diagram of Fragment Processing Pipeline 260 including programmable graphics processing units Shader 255 and Raster Analyzer 265. Shader 255 and Raster Analyzer 265 process multiple data formats that represent both program instructions and a plurality of data elements. The program instructions and data elements are stored in Local Memory 240 and/or Host Memory 112. The information defining the format for each data element is available in codewords generated from program instructions and/or in state bundles output by Geometry Processor 230 through Rasterizer 250. Codewords and state bundles can both pass through Fragment Processing Pipeline 260. Additionally, the information defining the format for each data element can be maintained as part of the state information within each pipeline unit.

A Shader Triangle Unit 310 calculates plane equations for texture coordinates, depth, and other parameters. A Gate Keeper 320 performs a multiplexing function, selecting between the pipeline data from Rasterizer 250 and Shader Triangle Unit 310 and a Feedback Output 376 of a Combiners 370. Gate Keeper 320 receives the state bundles and/or codewords from Shader Triangle Unit 310 and inserts the state bundles and/or codewords in the data stream output to Shader Core 330. The state bundles and/or codewords are passed through Shader 255 to Raster Analyzer 265. Shader Core 330 initiates Local Memory 240 or Host Memory 112 read requests through a Texture 340 that are processed by Memory Controller 220 to read map data (height field, bump, texture, etc.) and program instructions. Shader Core 330 also performs floating point computations such as triangle parameter interpolation and reciprocals. Fragment data processed by Shader Core 330 is optionally input to a Core Back End FIFO 390.

The read map data or program instructions are returned to Texture 340. Texture 340 unpacks and processes the read map data that is then output to a Remap 350 along with the program instructions. Remap 350 interprets the program instructions and generates codewords which control the processing completed by the graphics processing units in Fragment Processing Pipeline 260. When multi-pass operations are being performed within Shader 255, Remap 350 also reads the data fed back from Combiners 370 via a Quad Loop Back 356, synchronizing the fed back data with the processed map data and program instructions received from Texture 340, as explained more fully herein. Remap 350 formats the processed map data and fed back data, outputting codewords and formatted data to Shader Back End 360. Shader Back End 360 receives fragment data from Shader Core 330 via Core Back End FIFO 390 and triangle data from Gate Keeper 320. Shader Back End 360 synchronizes the fragment and triangle data with the formatted data from Remap 350. Shader Back End 360 performs computations using the input data (formatted data, fragment data, and triangle data) based on codewords received from Remap 350. Shader Back End 360 outputs codewords and shaded fragment data.

The output of Shader Back End 360 is input to Combiners 370 where the codewords are executed by the programmable computation units within Combiners 370 that, in turn, output combined fragment data. The codewords executing in the current pass control whether the combined fragment data will be fed back within Shader 255 to be processed in a subsequent pass. Combiners 370 optionally output codewords, to be executed by Shader Core 330 and Texture 340 in a subsequent pass, to Gate Keeper 320 using Feedback Path 376. Combiners 370 also optionally output combined fragment data to Quad Loop Back 356 to be used by Remap 350 in a subsequent pass. Finally, Combiners 370 optionally output combined fragment data, e.g., x, y, color, depth, configuration control, other parameters, to Raster Analyzer 265. Raster Analyzer 265 performs raster operations, such as stencil test, z test, blending, etc., using the combined fragment data and pixel data stored in Local Memory 240 or Host Memory 112 at the x,y location associated with the combined fragment data. The output data from Raster Analyzer 265 is written back to Local Memory 240 or Host Memory 112 via Memory Controller 220 at the x,y locations associated with the output data. The output data is represented in one or more formats as specified by the codewords. For example, color data may be written as 16, 32, or 64 bit per pixel fixed or floating-point RGBA to be scanned out for display. Alternatively, color data may be written out as 16, 32, 64, or 128 bit fixed or floating-point data to be used as a texture map by a shader program executed in a subsequent pass within Fragment Processing Pipeline 260 or through Graphics Processing Pipeline 205. Alternatively, color and depth data may be written, and later read and processed by Raster Analyzer 265 to generate the final pixel data prior to being scanned out for display via Output Controller 280.

Figure 4:
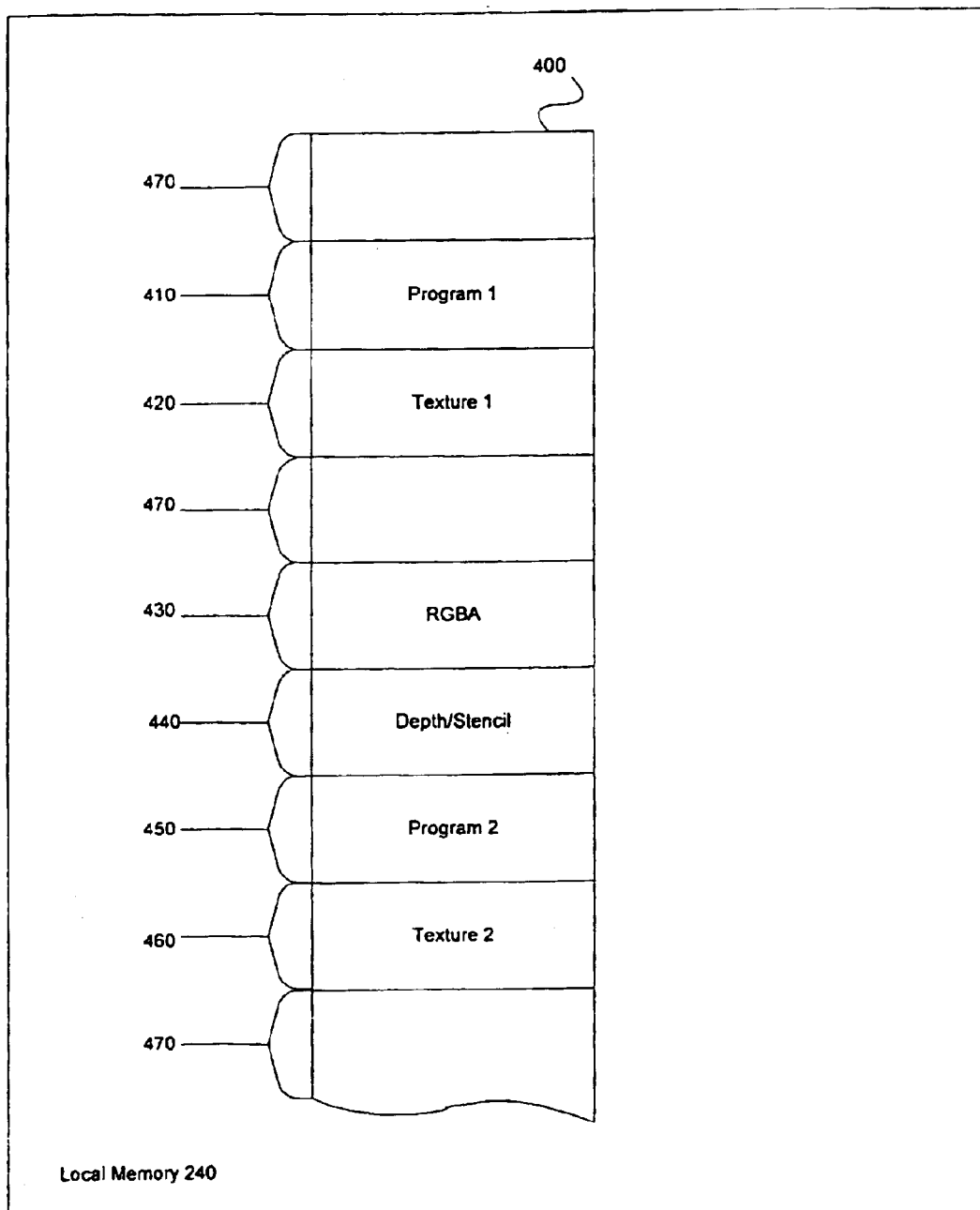
FIG. 4 illustrates a layout of surfaces stored in the Local Memory.

FIG. 4 illustrates the layout of surfaces of different formats in Local Memory 240, where a surface is a collection of related data. For example, a surface may be the color values for all of the pixels within a specific image to be scanned out or the depth values corresponding to the color values for the same image. As another example, a surface may be the depth values and color values interleaved pixel by pixel for a specific image to be used as a 3D texture map. The term surface as used herein can further include a surface that is a sequence of program instructions. In FIG. 4 element 400 represents a contiguous block of memory within Local Memory 240. In an alternate embodiment the contiguous block of memory is within Host Memory 112.

In this example the surface stored at memory locations 410 contains the instructions for program 1. A surface includes one or more data elements stored in memory entries, where a memory entry is a uniquely addressable location in Local Memory 240. Each memory entry can include a plurality of data elements where each data element is a program instruction, color component, texel (texture element) component, depth, or the like. The surface stored at memory locations 420 contains texture map data for texture 1. Each texel typically contains four 8 bit fixed point values, one each for red, green, blue, and alpha (RGBA). The surface stored at memory locations 430 contains color (RGBA), data elements for each fragment where the color is typically four 8 bit values for RGBA. The surface stored at memory locations 440 contains depth and stencil data elements for each fragment within an image, where the depth is typically a 24-bit fixed point value and stencil is typically an 8 bit fixed point value. In this example, the surface stored at memory locations 450 contains the instructions for program 2. The surface stored at memory locations 460 contains texture map data for texture 2. In this example, each texel contains three data elements which are each a 16 bit fixed point value representing RGB. Memory locations 470 are unused in this example.

The examples of data, such as color and depth, were selected for illustrative purposes. It is possible to store user-defined data in any format using the invention. The information specifying the format for the data elements in each surface is embedded in the program instructions or sent through Shader 255 as configuration control and is kept as state information in Graphics Processing Pipeline 205. The processing or interpretation of the user defined data using the state information will result in the data being characterized as program instructions, codewords, color, depth or some other graphics parameter represented in a specific format.

Figure 5:
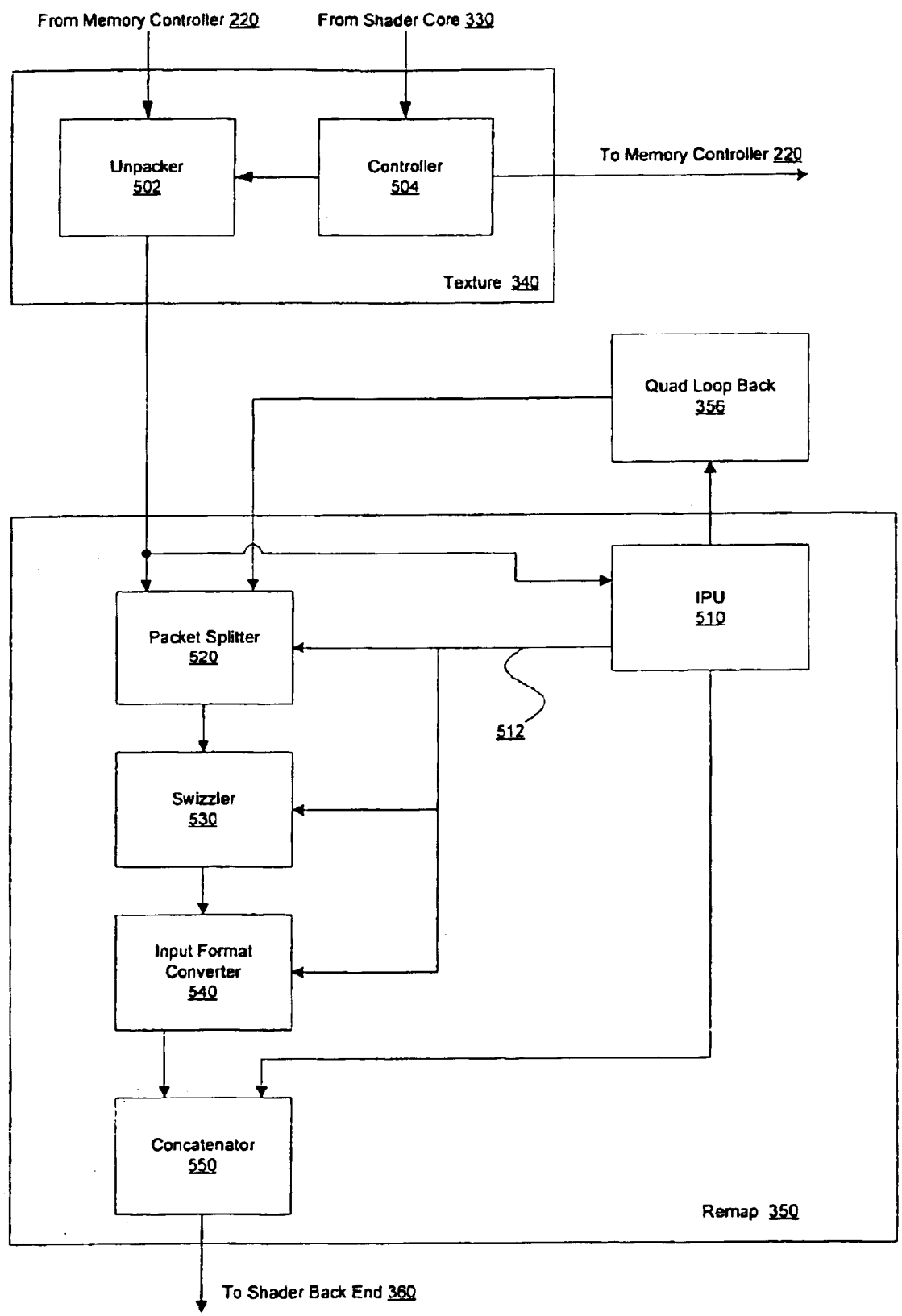
FIG. 5 is a block diagram of an embodiment of the Texture and Remap units of FIG. 3.

FIG. 5 is a block diagram of some of the elements of Texture 340 and Remap 350 of FIG. 3. A Controller 504 receives codewords and/or state bundles from Shader Core 330 and generates configuration controls for an Unpacker 502. Unpacker 502 receives a stream of data and program instructions read from Local Memory 240 (via Memory Controller 220) and unpacks the data into discrete data elements using the configuration controls and outputs the unpacked data, program instructions, state bundles, and codewords received from Controller 504 to Remap 350. Texture 340 outputs a stream of unpacked data, state bundles, codewords, and program instructions to Remap 350.

An Instruction Processing Unit (IPU) 510 receives the codewords and the read program instructions and outputs a new stream of codewords. IPU 510 determines if the read program instructions specify a read of source data from Quad Loop Back 356. Quad Loop Back 356 optionally contains source data written by Combiners 370. When a read is specified, IPU 510 generates read requests for Quad Loop Back 356. After the read request is made, IPU 510 schedules the calculations to be performed in Shader 255 and Raster Analyzer 265 and encodes the configuration and control information in codewords that are output to a Concatenator 550. IPU 510 also generates control information that is output to a Packet Splitter 520, a Swizzler 530, and an Input Format Convertor 540 via a Connection 512. The data read from Quad Loop Back 356 and data from Texture 340 are input to Packet Splitter 520. The functions of Packet Splitter 520, Swizzler 530, Input Format Converter 540, and Concatenator 550 in FIG. 5 are described further herein. Remap 350 outputs formatted data and codewords to Shader Back End 360 via Concatenator 550.

Figure 6:
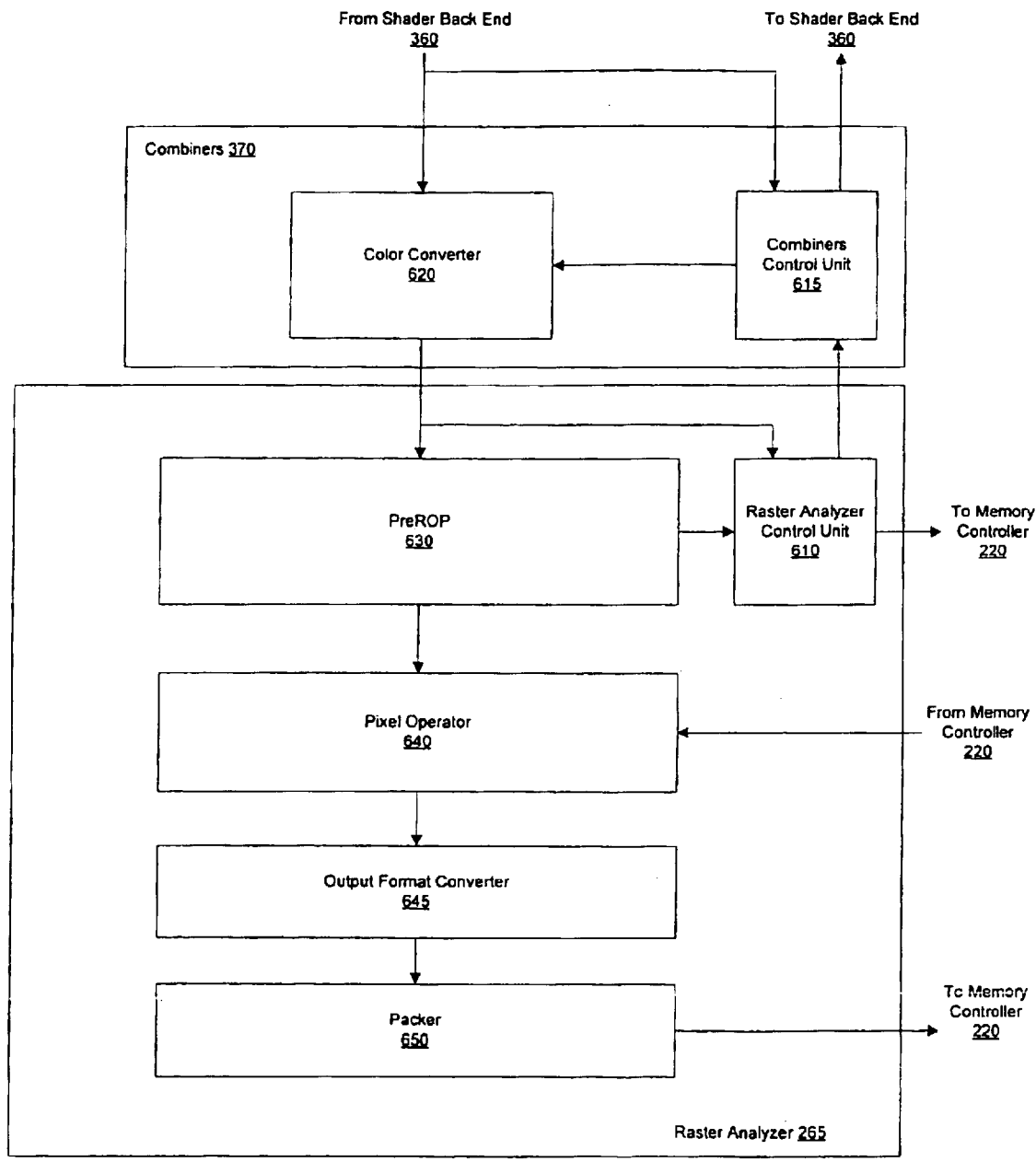
FIG. 6 is a block diagram of an embodiment of the Combiners and Raster Analyzer units of FIG. 3.

FIG. 6 is a block diagram of some of the elements of Combiners 370 and Raster Analyzer 265. Combiners 370 receives fragment data, state bundles, and codewords from Shader Back End 360 and combines the fragment data using programmable computation units. The combined fragment data is received by a Color Converter 620 that optionally converts color data represented in one format to color data represented in a different format and outputs the optionally converted combined fragment data, state bundles, and codewords to Raster Analyzer 265. Raster Analyzer 265 maps the optionally converted combined fragment data onto a pixel location in Local Memory 240 and optionally reads pixel data stored in Local Memory 240 and/or Host Memory 112 through Memory Controller 220. A Raster Analyzer Control Unit 610 interprets the codewords and state bundles and outputs control information to the other units within Raster Analyzer 265 and initiates read and write requests to Memory Controller 220. Control Unit 610 also detects when a PreROP 630 is not able to accept fragment data, state bundles, or codewords, and communicates that information to Combiners 370. PreROP 630 receives codewords and fragment data, typically color and depth, over one or more clock cycles depending on the format of the data. A Pixel Operator 640 optionally uses the read pixel data and fragment data to perform raster operations, e.g., depth test, alpha test, stencil test. An Output Format Converter 645 optionally converts the pixel data output of Pixel Operator 640 to a format specified by the state bundles and outputs converted pixel data to a Packer 650. Packer 650 packs the converted pixel data into contiguous bits that are optionally written to Local Memory 240 and/or Host Memory 112 via Memory Controller 220. The functions of the elements in FIG. 6 are described further herein.

Figure 7:
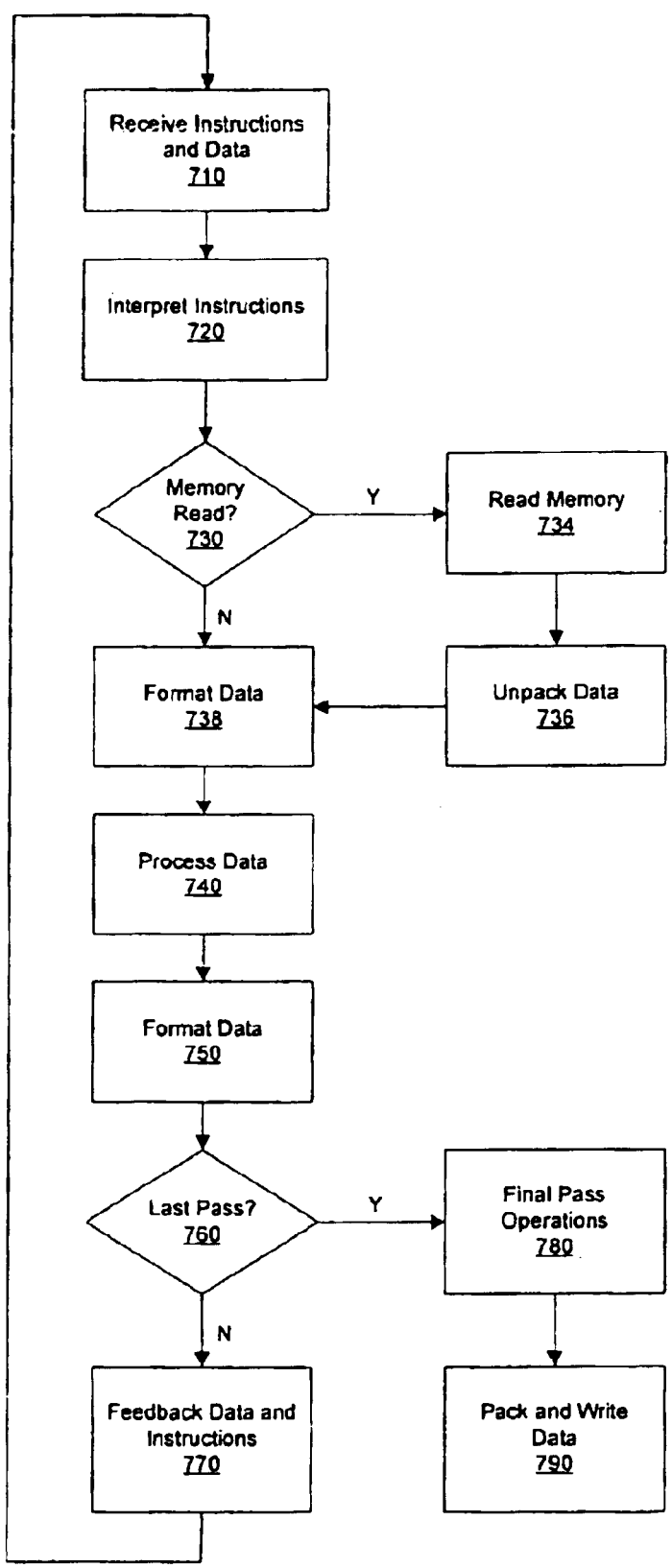
FIG. 7 is an embodiment of a method of the invention utilizing the Shader illustrated in FIG. 3.

FIG. 7 is a flowchart representing one method of the invention for processing data of different formats within Shader 255. In step 710 Gate Keeper 320 receives the state bundles, codewords, and data from Rasterizer 250 and Shader Triangle Unit 310 or from Combiners 370 and outputs a stream of codewords, state bundles, and data to Shader Core 330. In step 720, Shader Core 330 receives the stream of codewords, state bundles, and data from Gate Keeper 320 and identifies and interprets the codewords. In step 730, Shader Core 330 determines if the codewords require a read of source data stored in Local Memory 240. If a read is required, Shader Core 330 generates one or more read requests in step 734. In step 736 the read data is returned to Texture 340, which also receives codewords and state bundles from Shader Core 330. The read data from Local Memory 240 contains data elements represented in one or more formats. In step 736 Texture 340 unpacks the read data, received from Local Memory 240 via Memory Controller 220, according to the codewords or state bundles and passes a stream of unpacked read data, codewords, state bundles, and program instructions to Remap 350.

In step 730 if a read is not required, the codeword and state bundle stream is output by Shader Core 330 to Texture 340 and then to Remap 350 and steps 734 and 736 are not executed. In step 738 Remap 350 receives unpacked read data and/or data from a previous pass via Quad Loop Back 356 and converts the data as specified by the codewords or state bundles and generates formatted data. Remap 350 outputs a formatted data, state bundle, and codeword stream to Shader Back End 360 and Combiners 370 to be processed in step 740. Combiners 370 process the formatted data according to the codewords received from Remap 350 using configurable arithmetic components. In step 750 the data, state bundle, and codeword stream output by Combiners 370 is received by Raster Analyzer 265 and the data is formatted as specified by the state bundles and is processed as specified by the codewords. In step 760 Raster Analyzer 265 and Combiners 370 use the codewords to determine if this is the last pass of the data through Shader 255. If it is the last pass, final pass operations such as a depth check, fog operations, and the like, as explained more fully herein, are executed in step 780. In step 790 Raster Analyzer 265 efficiently packs the data elements prior to writing them to Local Memory 240 via Memory Controller 220. The codewords optionally specify that only the image data is written to Local Memory 240. In this manner, Raster Analyzer 265 separates the image color data from the depth or other user defined data prior to display. After step 790 the data has been processed and is ready to be scanned out by Output Controller 280.

In step 760 if it is not the last pass through Shader 255, then in step 770 Combiners 370 output data to Quad Loop Back 356 and state bundles and codewords to Gate Keeper 320 for processing in a subsequent pass. Processing then resumes with step 710 when Gate Keeper 320 receives state bundles and codewords from Combiners 370 on Feedback Output 376.

Support for multi-pass processing allows using any combination of a graphics memory, e.g., Local Memory 240 and storage resources within Graphics Processing Pipeline 205 such as register files and the like, to store intermediate data values generated by Graphics Processing Pipeline 205. Each intermediate data value is stored in the graphics memory as a data element in one of several formats, permitting the user to maintain a specific level of precision and specify the data format representation for each pass through Graphics Processing Pipeline 205, Fragment Processing Pipeline 260, and/or Shader 255. The intermediate data values generated by Graphics Processing Pipeline 205 are written to Local Memory 240 or to Host Memory 112 by Memory Controller 220 after execution of a first program and the intermediate data values are optionally read by the Geometry Processor 230, Shader 255, and Raster Analyzer 265 in a subsequent pass to execute a second program. Programs are stored in Local Memory 240 or in Host Memory 112 and are read by graphics processing units in Graphics Processing Pipeline 205, such as Shader 255 and Geometry Processor 230.

Figure 8:
FIG. 8 illustrates an embodiment of the interleaving of different data formats within a memory entry.

In contrast to FIG. 4, which illustrated an example of storing several surfaces in Local Memory 240 where each surface includes one or more memory entries where each memory entry contains data in a one or two formats, FIG. 8 illustrates an example of interleaving data elements represented in varying formats within a memory entry 800, where data elements represented in several different formats are stored within a memory entry. Memory entry 800 can be located in Local Memory 240 or Host Memory 112. Memory entry 800 is 128 bits and the 4 data elements stored in portion 810 are each represented in 8 bit fixed point format which is a format that RBGA would typically be stored in. The data elements stored in portions 820 and 840 are represented in 32 bit floating point format. A 32 bit floating point format is useful to represent intermediate results during multi-pass processing to maintain precision and dynamic range. It is particularly important to maintain precision for geometric data written by either Host Computer 110 or Raster Analyzer 265 and input to Texture 240 or Geometry Processor 230. The two data elements stored in portion 830 are each represented in 16 bit floating point format. Within memory entry 800 adjacent data elements can be represented in different formats. Adjacent data elements are data elements stored in contiguous locations within a memory entry. For example, the data elements adjacent to the data element stored in portion 820 are the data element stored in portion 830 (in the 16 bits in the location contiguous with portion 820) and the data element stored in portion 810 (in the 8 bits in the location contiguous with portion 820). Similarly, adjacent data elements are data elements stored in contiguous memory entry locations and adjacent memory entries are memory entries stored in contiguous locations within Local Memory 240.

It is possible to store formats having more than 32 bits, such as 64 and 128 bit formats and even larger formats as desired, storing the data in multiple memory locations as needed. Different formats may be used within a surface so that RGBA is stored in the same memory entry as depth or other user defined data elements. Furthermore, RGBA for a particular surface can be stored at a different level of precision than depth for the same particular surface, e.g., RGBA as four 16 bit floating point values and depth as one 32 bit floating point value. Furthermore, the format of any data element may be changed for each pass through Shader 255, Fragment Processing Pipeline 260, or Graphics Processing Pipeline 205.

Figure 9:
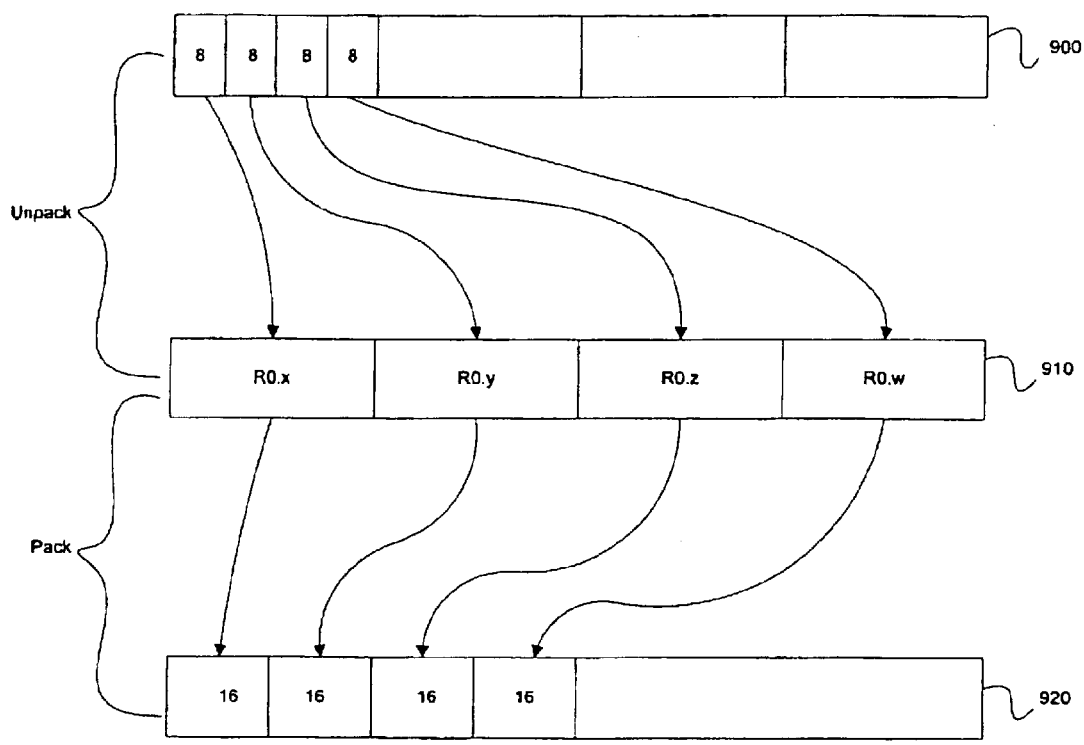
FIG. 9 illustrates an embodiment of the invention wherein data is unpacked, processed and packed.

FIG. 9 illustrates an embodiment of the invention wherein data read from Local Memory 240 is unpacked, format converted, processed, format converted, and packed prior to being written back to Local Memory 240. In an alternate embodiment the data is read from Host Memory 112 and written back to Local Memory 240 or Host Memory 112. In this example the data elements in Local Memory 240, stored in memory entry 900 are in 8 bit fixed point format and are unpacked by Texture 340 and converted to 32 bit floating point format by Remap 350 as shown in a 128 bit bus 910, where R0.x, R0.y, R0.z, and R0.w are each 32 bit floating point data elements. The unpacked and converted data is output to Shader Back End 360 via Remap 350 and processed by Shader Back End 360 and Combiners 370 and output to Raster Analyzer 265. In one embodiment the data is converted to 16 bit floating point values before it is output by Raster Analyzer 265. In an alternate embodiment the data would be in a different format, with any number of bits representing a fixed or floating point value, generated by the computational units within Shader Back End 360 or Combiners 370. Prior to writing the data back to Local Memory 240, Raster Analyzer 265 converts the data elements into formats specified by the state bundles and packs the data prior to outputting it to Memory Controller 220. This is shown in memory entry 920 where the four data elements have been converted into 16 bit floating point values, packed into 64 contiguous bits, and written to Local Memory 240. Additional data elements may be packed into the remaining bits before being sent to Memory Controller 220. The additional data elements may be of a format other than 16 bit floating point. In an alternate embodiment the data elements are written to Host Memory 112.

The graphics pipeline unit reading Local Memory 240 or Host Memory 112 unpacks each entry and converts each data element contained in an entry to the format specified by the codewords or state bundles. The graphics pipeline unit writing Local Memory 240 or Host Memory 112 converts the processed data to the format specified by the codewords or state bundles and packs the data elements before writing the memory entry. The state information specifying the format of data written to and read from memory does not need to be stored in the memory, because it is included in the pipeline state maintained within the pipeline units or available in codewords generated from program instructions passing through Fragment Processing Pipeline 260.

Figure 10:
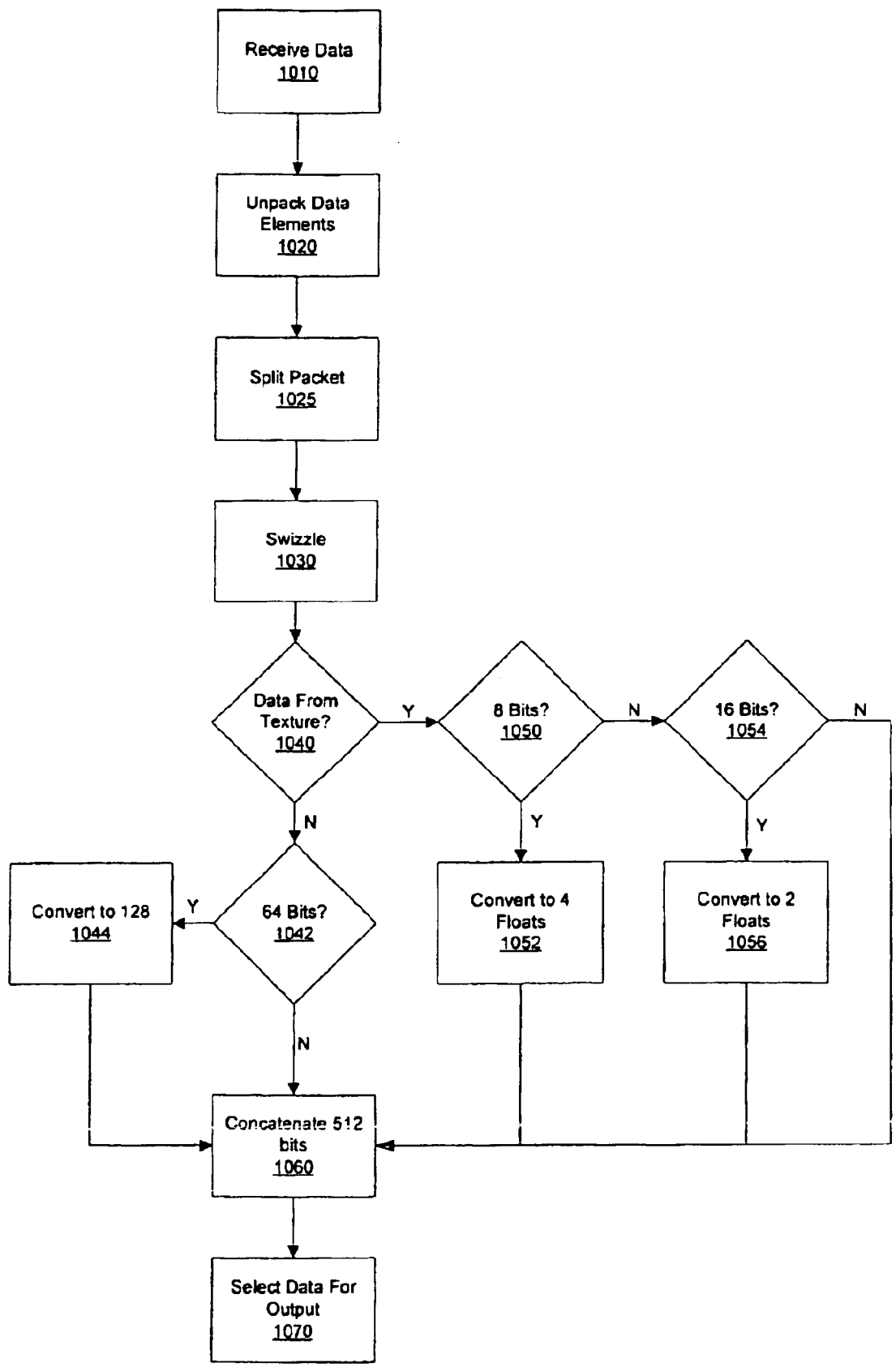
FIG. 10 illustrates an embodiment of a method of the invention utilizing the Texture and Remap units illustrated in FIG. 5.

FIG. 10 illustrates an embodiment of a method of the invention utilizing Texture 340 and Remap 350 and is a detailed illustration of steps 736, 738, 740, and 750 of FIG. 7. In step 1010 the stream of read data from Memory Controller 220 is received by Texture 340. In step 1020 the data elements are unpacked by Unpacker 502. The unpacked read data elements are output by Texture 340 to Remap 350. The unpacked read data and Quad Loop Back 356 data are received by Packet Splitter 520. In step 1025 Packet Splitter 520 uses the control information received from IPU 510 to combine the two data streams into a single stream and split the data into bytes as necessary for Swizzler 530. In step 1030 the data elements are swizzled by Swizzler 530 as specified by the control instructions output by IPU 510. In this embodiment the Swizzler 530 optionally replicates any of the data elements to one or more of the other data element locations. In another embodiment Swizzler 530 optionally reorders and/or replicates the data elements. In step 1040 a determination is made as to whether the data output by Swizzler 530 was read data received from Texture 340. In this example the data from Texture 530 is 32 bits wide and therefore comprises a portion of a data element, one 32 bit data element, or multiple data elements. If the texture processed data was received from Texture 340, step 1050 determines whether the data is represented in 8 bit fixed point format, and, if so, in step 1052 Input Format Converter 540 converts the four 8 bit fixed point values to four 32 bit floating point values. In step 1050, if Input Format Converter 540 determines that the data was not represented in 8 bit fixed point format, in step 1054 Input Format Converter 540 determines whether the data is represented in 16 bit fixed point format, and, if so, in step 1056 Input Format Converter 540 converts the two 16 bit fixed point values to two 32 bit floating point values. In step 1054, if Input Format Converter 540 determines the data was not represented in 8 or 16 bit fixed point format it is a 32 bit float value and is passed through Input Format Converter 540 unchanged.

In step 1040, Input Format Converter 540 determines whether the data output by Swizzler 530 was received from Texture 340, and, if not, in step 1042 Input Format Converter 540 determines whether the data is in 64 bit floating point format, and, if so, in step 1044 Input Format Converter 540 converts the data to a 128 bit format. In step 1042 if Input Format Converter 540 determines the data is not in 64 bit floating point format it is in 128 bit floating point format and it is output to Concatenator 550 unchanged. In step 1060, Concatenator 550 receives the data output from Input Format Converter 540 and concatenates the data to generate a 512 bit data value. In step 1070, Concatenator 550 selects 512 bit data values and codewords received from IPU 510 to generate an output stream from Remap 350 to Shader Back End 360.

Figure 11:
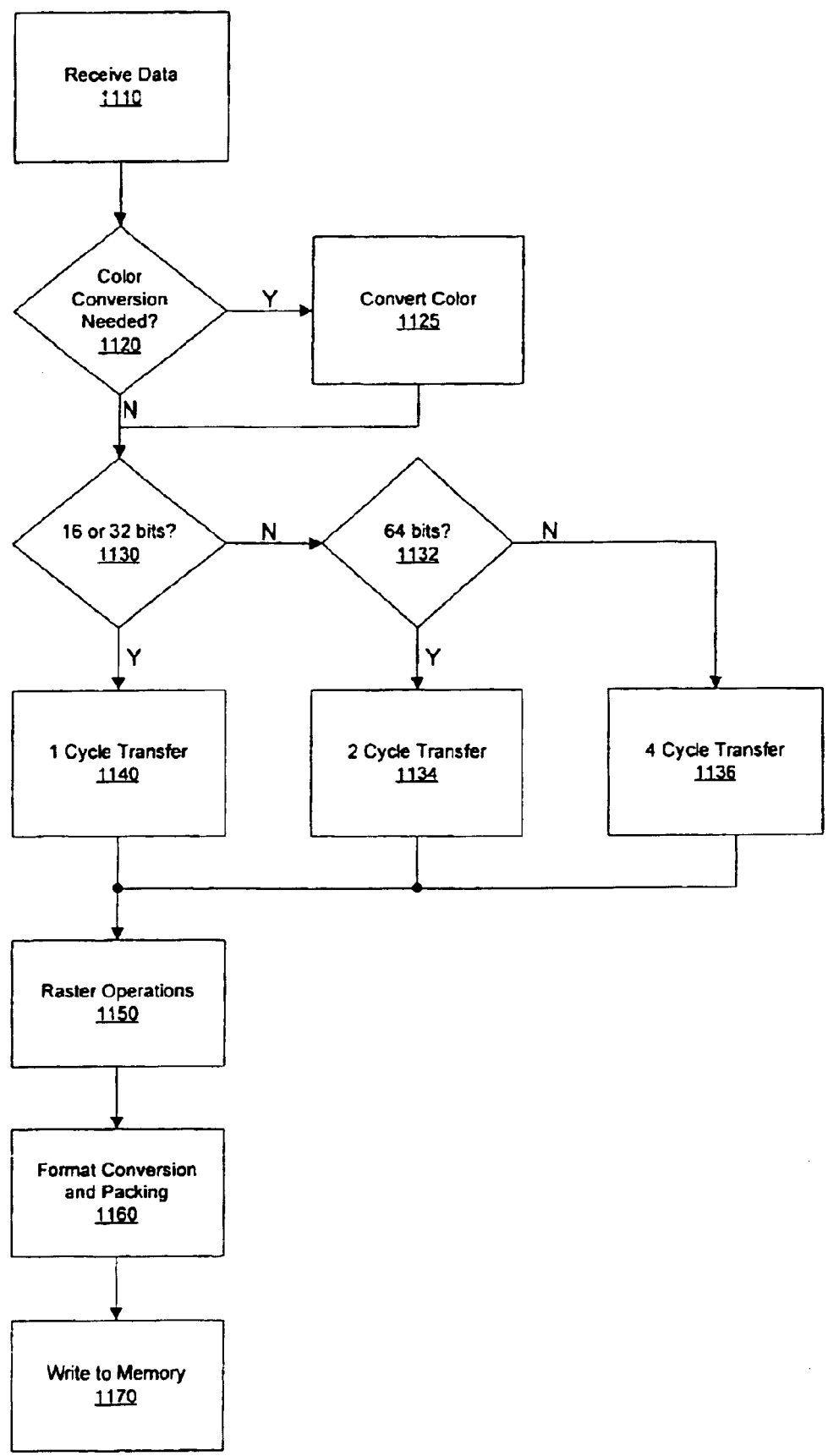
FIG. 11 illustrates an embodiment of a method of the invention utilizing the Combiners and Raster Analyzer units illustrated in FIG. 6.

FIG. 11 illustrates a method of the invention utilizing Combiners 370 and Raster Analyzer 265 and is a detailed illustration of steps 780 and 790 of FIG. 7. In step 1110 combined fragment data is received by Color Converter 620 in Combiners 370. In step 1120 Combiners Control Unit 615 determines if color conversion is required and if it is, Color Converter 620 computes the color conversion in step 1125. In step 1130 Combiners Control Unit 615 determines whether the combined fragment data or color converted data is in 16 or 32 bit format, and, if not, in step 1132 Combiners Control Unit 615 determines whether the combined fragment data or color converted data is in 64 bit format, and, if not, in step 1136 Color Converter 620 outputs the fragment data or color converted data to PreROP 630 in 4 cycles. If in step 1132 Combiners Control Unit 615 determines the combined fragment data or color converted data is in 64 bit format, in step 1134 Color Converter 620 outputs the fragment data or color converted data to PreROP 630 in 2 cycles. If in step 1130 Combiners Control Unit 615 determines the combined fragment data or color converted data is in 16 or 32 bit format, in step 1140 Color Converter 620 outputs the fragment data or color converted data to PreROP 630 in 1 cycle. Alternatively, Combiners Color Converter 620 outputs 128 bits per clock cycle and outputs 64, 32, and 16 bit data in a single clock cycle. Using an embodiment of the invention in which Color Converter 620 outputs 128 bits per clock cycle a person skilled in the art will recognize that steps 1140, 1134, 1136 are replaced with steps that gather data over one or more clock cycles.

In step 1150, PreROP 630 outputs fragment data to Pixel Operator 640. Pixel Operator 640 uses the fragment data and the pixel data read from Local Memory 240 or Host Memory 112 via Memory Controller 220 to generate updated pixel data performing traditional raster operations such as stencil and depth test. Output Format Converter 645 and Packer 650 perform step 1160, optionally converting the updated pixel data to a format specified by the codewords or state bundles and packing the converted data. In step 1170 Raster Analyzer 265 optionally writes the packed converted data to Local Memory 240 or Host Memory 112 via Memory Controller 220.

Figure 12:
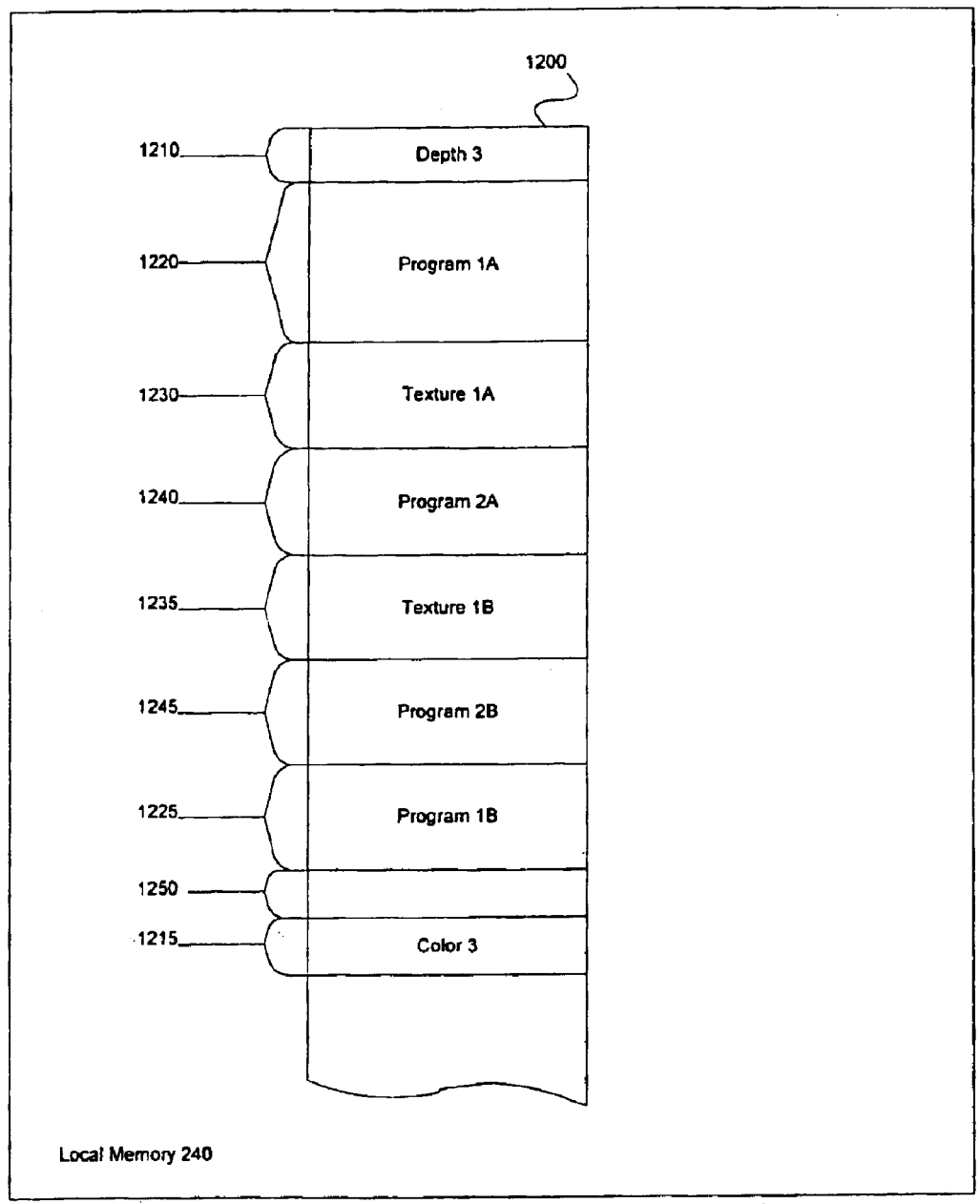
FIG. 12 illustrates an embodiment of interleaving program data and fragment data in the local memory.

In contrast to FIG. 4 which illustrated an embodiment of storing surfaces such as program instructions and map or image data in Local Memory 240 where the data for each surface is stored contiguously, FIG. 12 illustrates an embodiment of interleaving portions of surfaces in Local Memory 240. Alternatively the portions of surfaces are stored in any combination of Local Memory 240 and Host Memory 112. The advantage of interleaving portions of surfaces is that surfaces requiring large amounts of memory can be divided into portions that are not stored contiguously. This permits more efficient utilization of Local Memory 240. In FIG. 12 element 1200 represents a contiguous block of memory within Local Memory 240. Multiple data elements are stored in a memory entry and optionally each of the data elements within an entry is represented in one of several different formats. The memory entries are optionally interleaved so that data elements are interleaved with program instructions entry-by-entry. Furthermore, data elements associated with a surface are optionally stored at arbitrary contiguous or noncontiguous memory entries within Local Memory 240 rather than storing the surface data elements in predefined contiguous memory entries. In this example Program 1 is stored as portions Program 1A and Program 1B in noncontiguous memory, where Program 1A is stored at memory locations 1220 and Program 1B is stored at memory locations 1225. Likewise, Program 2 is stored as portions Program 2A and Program 2B in noncontiguous memory, where Program 2A is stored at memory locations 1240 and Program 2B is stored at memory locations 1245. In this example the program data for Program 1 and Program 2 is interleaved in Local Memory 240 with Texture 1. Texture 1 is stored as portions Texture 1A and Texture 1B in noncontiguous memory, where Texture 1A is stored at memory locations 1230 and Texture 1B is stored at memory locations 1235. Data corresponding to the pixels comprising an image is stored as portions Depth 3 and Color 3 in noncontiguous entries where the depth values, Depth 3, are stored in contiguous memory at memory locations 1210 and the color values, Color 3, are stored in separate contiguous memory at memory locations 1215.

When multi-pass processing is employed it is possible to store intermediate data overwriting the data stored during the previous pass. For example, when data corresponding to a particular pixel is generated in multiple passes, the pixel data may be overwritten during each pass. When the first pass generates 16 bit floating point values for RGBA and 32 bit floating point values for depth, each pixel requires 96 bits of storage. In a second pass the data is processed and 8 bit fixed point values are generated for RGB, so each pixel requires only 24 bits of storage. In this case the number of memory entries required to store the surface representing an image composed of these pixels varies from pass to pass. Rather than dedicating a number of memory entries sufficient to store the largest size of the surface generated during a pass, a program optionally allocates memory entries for the size of the surface generated for each pass. Furthermore, if the intermediate data is stored without overwriting data stored during a previous pass, the number of memory entries required to store the surface will also vary from pass to pass. The intermediate data generated for each pass is stored contiguously or noncontiguously. Regardless of whether the intermediate data is stored contiguously or not, the memory entry for a pixel's data can be located using the pixel's location, e.g., (x, y).

Figure 13:
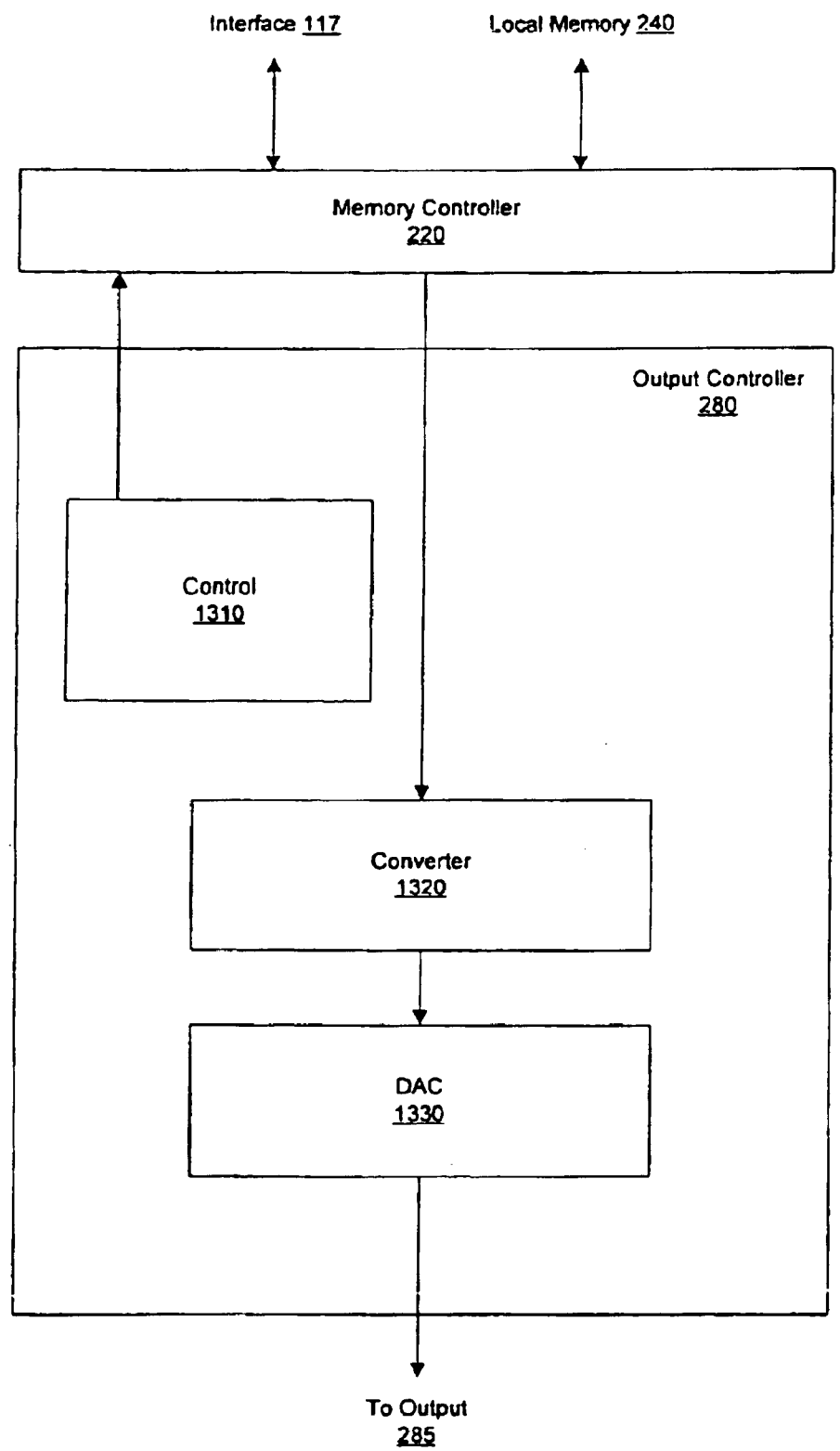
FIG. 13 is a block diagram of an embodiment of the Output Controller of FIG. 2.

FIG. 13 is a block diagram of the units used for the scanout function. In an embodiment of the invention image data stored in fixed or floating point format is scanned out by Output Controller 280 and displayed. A Control 1310 includes a read interface that generates requests to read the image data from Local Memory 240 or Host Memory 112 via Memory Controller 220. A Converter 1320 receives and converts the image data elements into the format required by the DAC. The converted data is output by Converter 1320 to a DAC 1330. DAC 1330 processes the converted data by converting the digital signals representing the converted data into analog signals. Converter 1320 performs the conversion computation using a barrel shifter, scale function, normalizer, or the like. A person skilled in the art will recognize the conversion functionality may also be incorporated into DAC 1330.

The invention has been described above with reference to specific embodiments. It will, however, be evident that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A computing system comprising:
   a host processor;
   a host memory, the host memory storing programs for the host processor;
   a system interface configured to interface with the host processor; and
   a processor configured to interface with the system interface comprising:
   a) a read interface configured to read from a memory a data element and program instructions, the data element represented in one of several formats;
   b) an input format converter configured to convert the data element to a converted data element represented in an other of the several formats identified by the instructions;
   c) a computation unit configured by the program instructions to perform calculations on the converted data element to generate a calculated data element;
   d) an output format converter configured to convert the calculated data element to a converted calculated data element represented in one of the several formats identified by the instructions; and
   e) a write interface configured to write the converted calculated data element to the memory.

2. The computing system of claim 1, wherein the host memory is configured to interface with the system interface.

3. The computing system of claim 2, wherein the host memory is a graphics memory, the processor is a graphics processor and the program instructions are graphics program instructions.

4. The computing system of claim 3, wherein the output format converter comprises:
   a read interface configured to receive from the graphics memory image data represented in floating point format;
   a converter configured to convert the image data represented in floating point format to converted image data represented in an other format; and
   a digital to analog converter (DAC) that processes the converted image data.

5. The computing system of claim 1, wherein the host memory is configured to directly interface with the host processor.

6. A system as claimed in claim 1 wherein the computation unit is configured by a second set of the program instructions to read the converted calculated data from the memory and perform calculations on the read data.

7. A system as claimed in claim 6 wherein the format of the data read from the memory is available in the second set of instructions.

8. A system as claimed in claim 1 wherein the instructions specify the one of several formats in which the converted calculated data element is stored in memory to specify the level of precisions of the calculations.

9. A system as claimed in claim 1 wherein the processor is a multi-pass processor and the instructions identify the data format in the one and the another of the several formats in each pass through the processor.

10. A programmable graphics fragment processing pipeline comprising:
 a) a read interface configured to read from a graphics memory a data element and graphics program instructions, the data element represented in one of several formats, the one format being identified by the instructions;
 b) an input format converter configured to convert the data element to a converted data element represented in an other of the several formats;
 c) a computation unit configured by the graphics program instructions to perform calculations on the converted data element to generate a calculated data element;
 d) an output format converter configured to convert the calculated data element to a converted calculated data element represented in another one of the several formats, the another one format being identified by the instructions; and
 e) a write interface configured to write the converted calculated data element to the graphics memory.

11. The programmable graphics fragment processing pipeline of claim 10 wherein the read interface is further configured to read from a host memory the data element represented in one of several formats and the write interface is further configured to write the converted calculated data element to the host memory.

12. The programmable graphics fragment processing pipeline of claim 10 wherein one of the several formats is selected from the group consisting of a 16 bit floating point format, a 32 bit floating point format, a 64 bit floating point format, an 8 bit integer format, a 12 bit integer format, and a 16 bit integer format.

13. The programmable fragment processing pipeline of claim 10 wherein the graphics program instructions include information specifying, of the several formats, which format is used to represent the data element, the converted data element, and the converted calculated data element, the information kept as state information in the programmable graphics fragment processing pipeline.

14. The programmable graphics fragment processing pipeline of claim 10 including:
 a read interface configured to receive from the graphics memory image data represented in floating point format;
 a converter configured to convert the image data represented in floating point format to converted image data represented in an other format; and
 a digital to analog converter (DAC) that processes the converted image data.

15. The programmable graphics fragment processing pipeline of claim 10 wherein the calculations performed by the computation unit use a data element generated by an other computation unit in the programmable graphics fragment processing pipeline.

16. The programmable graphics fragment processing pipeline of claim 10 wherein the data element read from the graphics memory has an adjacent data element represented in an other of the several formats.

17. The programmable graphics fragment processing pipeline of claim 10 wherein the read interface is further configured to read a plurality of data elements from the graphics memory, the plurality of data elements associated with a pixel location, the plurality of data elements comprising at least three different data formats, the plurality of data elements being adjacently stored in the graphics memory.

18. The programmable graphics fragment processing pipeline of claim 10 wherein the data element to be read from the graphics memory is within a first surface.

19. The programmable graphics fragment processing pipeline of claim 18 wherein the data element written to the graphics memory is within a second surface.

20. The programmable graphics fragment processing pipeline of claim 18 wherein the data element written to the graphics memory is within a third surface.

21. A system as claimed in claim 10 wherein the computation unit is configured by a second set of the graphics program instructions to read the converted calculated data from the memory and perform calculations on the read data.

22. A system as claimed in claim 21 wherein the format of the data read from the memory is available in the second set of instructions.

23. A system as claimed in claim 10 wherein instructions specify the one of several formats in which the converted calculated data element is stored in memory to specify the level of precisions of the calculations.

24. A system as claimed in claim 10 wherein the processor is a multi-pass processor and the instructions identify the data format in the one and the another of the several formats in each pass through the processor.

25. A method of using a computing system including a memory storing surfaces containing data elements each represented in one of several formats, comprising the steps of:
 a) reading one of the data elements from a first surface stored in the memory;
 b) format converting the read data element to a converted data element represented in an other of the several formats;
 c) processing the converted data element in a programmable graphics fragment processing pipeline under control of a first set of graphics program instructions to generate one or more processed data elements corresponding to a fragment;
 d) format converting the one or more processed data elements to converted generated one or more data elements each represented in one of the several formats;
 e) writing the converted one or more processed data elements to a second surface stored in the memory; and
 f) repeating steps (a) through (e), wherein the processing of step (c) is performed under control of a second set of graphics program instructions.

26. The method of claim 25, wherein the memory is a graphics memory.

27. The method of claim 25, wherein the memory is a host memory.

28. A method of using a memory storing surfaces containing data elements each represented in one of several formats, comprising the steps of:
 a) reading one of the data elements from a first surface stored in the memory;
 b) format converting the read data element to a converted data element represented in an other of the several formats;
 c) processing the converted data element in a programmable graphics fragment processing pipeline under control of a first set of graphics program instructions to generate one or more processed data elements corresponding to a fragment;

d) format converting the one or more processed data elements to converted generated one or more data elements each represented in one of the several formats;

e) writing the converted one or more processed data elements to a second surface stored in the memory; and f) repeating steps (a) through (e), wherein the processing of step (c) is performed under control of a second set of graphics program instructions.

29. The method of claim 28 wherein the memory is any combination of a graphics memory and a host memory.

30. The method of claim 28 wherein the memory is any graphics memory.

31. The method of claim 28 further comprising the step of reading the graphics program instructions from the graphics memory.

32. The method of claim 28 wherein one of the several formats is selected from the group consisting of a 16 bit floating point format, a 32 bit floating point format, a 64 bit floating point format, an 8 bit integer format, a 12 bit integer format, and a 16 bit integer format.

33. The method of claim 28 wherein the graphics program instructions include information specifying, of the several formats, which format is used to represent the read data element, the converted data element, and the converted generated one or more data elements, the information kept as state information in the programmable graphics fragment processing pipeline.

34. The method of claim 28 wherein each of the converted generated one or more data elements written in the graphics memory has an adjacent data element represented in an other of the several formats.

35. The method of claim further comprising the steps of:

g) reading an other data element from the first surface stored in the graphics memory, the other data element represented in one of the several formats;

h) format converting the other data element to a converted other data element represented in an other of the several formats;

i) processing the converted other data element in a programmable graphics fragment processing pipeline under control of the first set, the second set or a third set of graphics program instructions to generate one or more processed other data elements corresponding to a fragment;

j) format converting the one or more processed other data elements to converted one or more processed other data elements each represented in one of the several formats; and k) writing the converted one or more processed other data elements to a third surface stored in the graphics memory.

36. The method of claim 28 wherein the converted one or more processed data elements written to the second surface stored in the graphics memory are written to at least portions of the graphics memory surface was stored in.

37. The method of claim 28 wherein the processing includes interpolation.

38. The method of claim 28 wherein the processing uses data generated by an other computation unit in the programmable graphics fragment processing pipeline.

39. A programmable graphics fragment processing pipeline comprising:

a) a read interface configured to read from a memory entry in graphics memory data elements each represented in one of several formats;

b) an unpacker configured to separate the data elements into unpacked data elements;

c) an input format converter configured to convert each unpacked data element represented in one of the several formats to a converted data element represented in an other of the several formats;

d) a computation unit configured by graphics program instructions to perform calculations on the converted data elements and generate calculated data elements;

e) an output format converter configured to convert the calculated data elements to converted calculated data elements each represented in one of the several formats;

f) a packer configured to pack the converted calculated data elements; and g) a write interface configured to write the packed data elements to the graphics memory, each of the packed data elements represented in one of the several formats.

40. The programmable graphics fragment processing pipeline of claim 39 wherein each of the packed data elements written to the graphics memory has an adjacent data element represented in an other of the several formats.

41. The programmable graphics fragment processing pipeline of claim 39 wherein the graphics program instructions are read from the graphics memory.

42. The programmable fragment processing pipeline of claim 41 wherein the graphics program instructions include information specifying, of the several formats, which format is used to represent the data elements, the unpacked data elements, the converted data elements, the converted calculated data elements, the packed data elements, the information kept as state information in the programmable graphics fragment processing pipeline.

43. The programmable graphics fragment processing pipeline of claim 39 wherein one of the several formats is selected from the group consisting of a 16 bit floating point format, a 32 bit floating point format, an 8 bit integer format, a 12 bit integer format, and a 16 bit integer format.

44. The programmable graphics fragment processing pipeline of claim 39 wherein the calculations performed by the computation unit include interpolation.

45. The programmable graphics fragment processing pipeline of claim 39 wherein the calculations performed by the computation unit use data generated by an other computation unit in the programmable graphics fragment processing pipeline.

46. A method of using a surface composed of graphics data elements stored in a graphics memory comprising the steps of:

a) reading a data element from the surface stored in the graphics memory, the data element represented in one of several formats;

b) unpacking the data element into an unpacked data element;

c) format converting the unpacked data element represented in one of the several formats to a converted unpacked data element represented in an other of the several formats;

d) processing the converted unpacked data element in the programmable graphics fragment processing pipeline under control of graphics program instructions to generate one or more processed data elements corresponding to a fragment;

e) format converting the one or more processed data elements to converted one or more processed data elements each represented in one of the several formats;

f) packing the converted one or more processed data elements into packed data elements; and g) writing the packed data elements into the graphics memory each represented in one of the several formats.

47. The method of claim 46 further comprising the steps of:

a) storing a first portion of the surface in a first group of memory entries in thegraphics memory; and b) storing a second portion of the surface in a second group of memory entries in the graphics memory, the second group of memory entries not adjacent to the first group of memory entries.

48. The method of claim 46 wherein the packed data elements are written into the graphics memory adjacent to a packed data element represented in an other of the several formats.

49. The method of claim 46 further comprising the step of reading the graphics program instructions from the graphics memory.

50. The method of claim 49 wherein the graphics program instructions include information specifying, of the several formats, which format is used to represent the data element, the converted unpacked data element, the converted one or more processed data elements, the packed data elements, the information kept as state information in the programmable fragment processing pipeline.

51. The method of claim 46 wherein one of the several formats is selected from the group consisting of a 16 bit floating point format, a 32 bit floating point format, an 8 bit integer format, a 12 bit integer format, and a 16 bit integer format.

* * * * *

UNITED STATES PATENT AND TRADEMARK OFFICE
CERTIFICATE OF CORRECTION

| | | |
|---|---|---|
| PATENT NO. | : 6,954,204 B2 | Page 1 of 1 |
| APPLICATION NO. | : 10/302465 | |
| DATED | : October 11, 2005 | |
| INVENTOR(S) | : Harold Robert Feldman Zatz et al. | |

It is certified that error appears in the above-identified patent and that said Letters Patent is hereby corrected as shown below:

In the Claims section:

In column 16, Claim 23, line 22, between "wherein" and "instructions", please insert --the--.

In column 17, Claim 30, line 16, please delete "any" and insert --a--.

In column 17, Claim 35, line 38, between "claim" and "further", please insert --28--.

In column 17, Claim 36, line 62, between "memory" and "surface", please insert --that the first--.

In column 19, Claim 47, line 16, please delete "thegraphics" and insert --the graphics--.

Signed and Sealed this

Seventh Day of November, 2006

JON W. DUDAS
*Director of the United States Patent and Trademark Office*